UNITED STATES PATENT OFFICE.

PETER R. LEVINGS, OF ROCKFORD, ILLINOIS.

MEDICAL COMPOUND.

SPECIFICATION forming part of Letters Patent No. 257,029, dated April 25, 1882.

Application filed August 3, 1881. (No specimens.)

*To all whom it may concern:*

Be it known that I, PETER R. LEVINGS, a citizen of the United States, residing in the city of Rockford, in the county of Winnebago and State of Illinois, have invented a new and useful composition of matter to be used as a remedial agent for the treatment of liver complaints and all diseases arising from a disordered condition of that organ, of which the following is a specification.

My composition consists of the following ingredients, combined in the proportions stated, viz: water, five gallons; poplar-bark, (*Liriodendron*,) sixteen pounds; wild-cherry bark, (*Prunus Virginiana*,) four and one-half pounds; prickly-ash bark, (*Xanthoxylum*,) two pounds; dandelion-root, (*Taraxacum*,) one-half pound; May-apple root, (*Podophyllum*,) three-sixteenths pound; Indian-turnip root, (*Arum*,) two-sixteenths pound; hops, (*Humulus*,) three-sixteenths pound. These ingredients are to be put together in a suitable vessel, preferably with closed lid, and if the barks and roots are not reduced to small particles by grinding, crushing, or otherwise, they should be boiled and simmered, steeped, or macerated for about two days, during which time the loss by evaporation should be supplied by additions of water in proper quantities at suitable intervals, and when properly macerated should be strained or filtered and bottled for use. When the barks and roots are properly reduced by grinding, crushing, or otherwise, which method I prefer, it will be found that properly boiling and simmering, steeping, or macerating for a period of about twenty-four hours will be sufficient to produce the proper extract.

This composition, prepared from the above ingredients in the proportions or about in the above proportions, and substantially in the manner hereinbefore stated, is found to be a valuable remedial agent for liver complaint and all diseases arising from a disordered condition of that organ, such as dyspepsia, constipation, jaundice, sick headache, dumb ague, fever and ague, biliousness, heartburn, and other kindred diseases.

In the foregoing I have given the ingredients in what is found to be about the best proportions and the best method of preparation; but these proportions and the method of preparation may be varied and still produce a valuable medicine.

The quantity of water may be increased and in the process of preparation be evaporated to the proper proportion; or the proportion of water may remain either greater or less and the dose be varied in proportion, and still be within the scope of my invention.

For a dose of the compound or extract made according to formula, three table-spoonfuls should be taken in water three times a day. If the stomach will not bear as much at first, the dose should be decreased and then gradually increased, as the patient can bear it.

What I claim, and desire to secure by Letters Patent of the United States, is—

The herein-described composition or extract, prepared from water, poplar-bark, wild-cherry bark, prickly-ash bark, dandelion-root, May-apple root, Indian-turnip root, and hops, substantially in the proportion hereinbefore set forth.

PETER R. LEVINGS.

Witnesses:
A. O. BEHEL,
JACOB BEHEL.